Patented Jan. 16, 1940

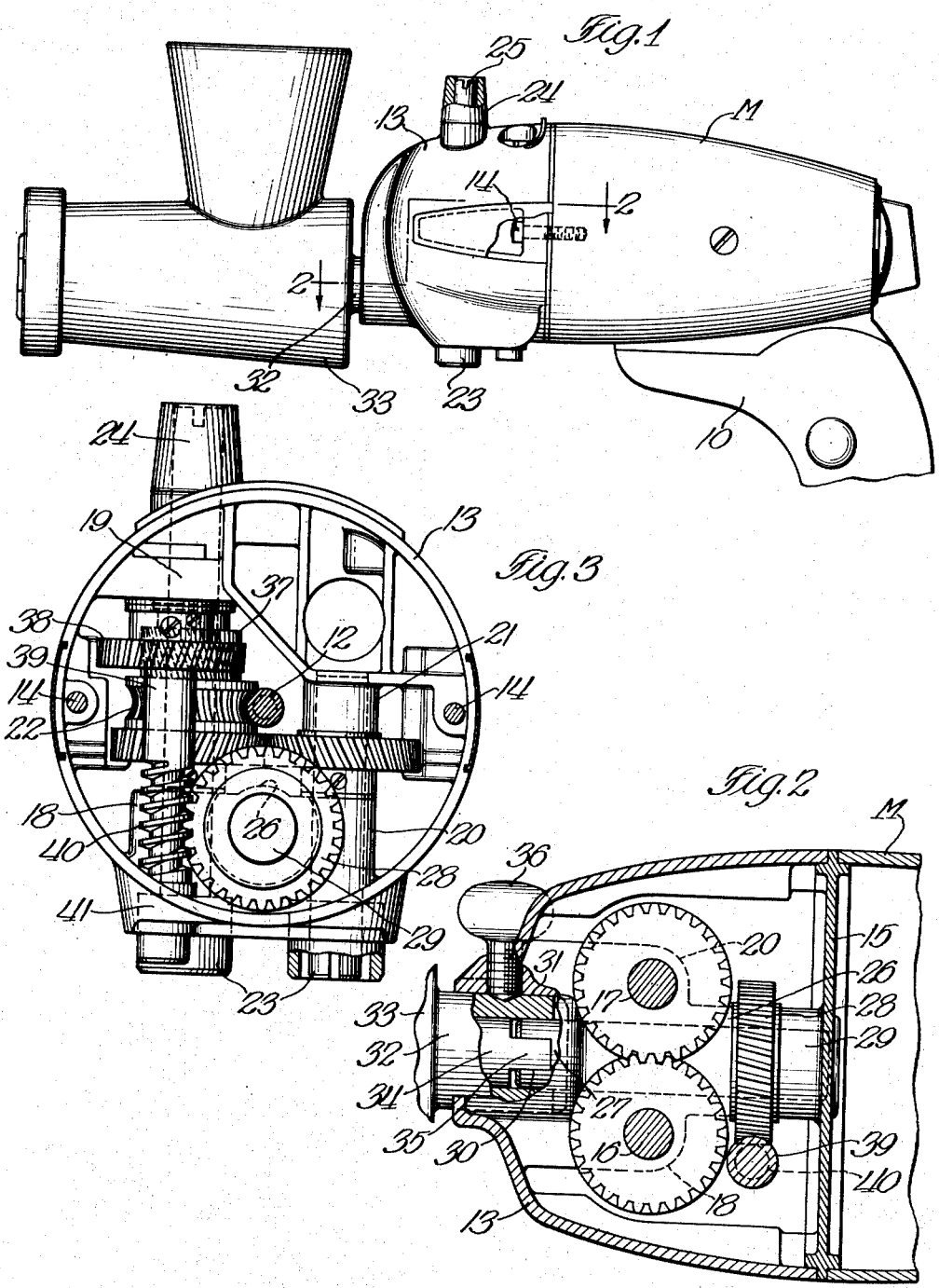

2,187,272

UNITED STATES PATENT OFFICE 2,187,272

POWER TAKE-OFF FOR FOOD MIXERS

William Bernard Kochner, St. Louis, Mo., assignor to Knapp-Monarch Company, St. Louis, Mo., a corporation of Missouri Application April 24, 1939, Serial No. 269,701

6 Claims. (Cl. 74—428)

An object of my present invention is to provide a power take-off for food mixers and the like which is simple and inexpensive to manufacture and provides a very compact arrangement of step-down gearing between the motor shaft and a power shaft.

More particularly it is my object to provide a power take-off assembly combined with gearing means for mixer and juicer shafts of a food mixer, the parts of the gearing structure being so arranged that they can be contained in a relatively small casing adapted to be connected with one end of the mixer motor.

Still another object is to provide the gearing so designed and mounted in the casing that the desired low speed of a power shaft can be secured from a relatively high speed motor shaft with mixer shafts being driven by the gearing at an intermediate speed.

The foregoing are among the main objects of this invention which consists of certain novel features of construction and combination of parts described with reference to the accompanying drawing and then claimed, having the above and other objects in view. In the accompanying drawing wherein I illustrate a suitable embodiment of the invention in which like numerals refer to like parts throughout the several different views thereof:

Figure 1 is a side elevation of my power take-off mounted on a food mixer motor and having a power driven food chopper associated therewith.

Figure 2 is an enlarged sectional view on the line 2—2 of Figure 1; and

Figure 3 is an inner end elevation of the power take-off per se with the inner end plate removed and the motor shaft shown in vertical cross section.

On the accompanying drawing I have used the reference numeral 10 to indicate a supporting arm of a food mixer and the character M to indicate a mixer motor. The motor M may be of electric or other suitable type and includes a motor shaft 12 having a worm tooth cut in to the periphery thereof.

The motor shaft 12 projects into a casing 13 which is secured to one end of the motor M as by screws 14. Interposed between the motor and the casing 13 is an inner end plate 15.

A pair of mixer shafts 16 and 17 are journaled in bearings 18, 19, 20 and 21 of the casing 13. These bearings are arranged to space the mixer shafts 16 and 17 laterally from each other and on opposite sides of the motor shaft 12. One of the mixer shafts 16 is provided with a worm gear 22 meshing with the worm 12.

The lower ends of the mixer shafts 16 and 17 are provided with suitable clutch or connecting collars 23 adapted to receive the usual type of egg beaters or food mixer elements. The upper end of the mixer shaft 16 extends into a boss 24 of the casing 13 and terminates in a slotted end 25 adapted to coact with a fruit juicing reamer in the usual manner.

Between the bearings 18 and 20 I provide a power shaft bearing 26. A power shaft 27 is journaled therein and its inner end is provided with a worm gear 28. Beyond the worm gear 28, the power shaft 27 is journaled in a bearing 29 of the inner end plate 15.

The outer end of the power shaft 27 is slotted as at 30 and extends into a socket 31 of the casing 13. The socket 31 is adapted to receive a boss 32 of a tool 33 to be operated by the power shaft. By way of illustration I show a power driven food chopper as the tool 33.

The tool 33 has a shaft 34 adapted to be driven by the power shaft 27. A blade 35 on the end of the shaft 34 enters the slot 30 for this purpose. A set screw 36 is provided to lock the boss 32 in the socket 31 and retain the shafts 27 and 34 in operative connection with each other.

For transmitting power to the shaft 27 I provide a pinion 37 on the mixer shaft 16. It meshes with a gear 38 on a counter-shaft 39. The counter-shaft in turn has a worm tooth 40 meshing with the worm gear 28. The lower end of the counter-shaft 39 is journaled in a bearing 41 while the upper end is journaled in the bearing 19. The bearings 18, 19, 20, 21, 26 and 41 are formed as bosses in the casing 13 and suitably bushed.

By arranging the mixer shaft 16 and 17 intermediate the socket 31 and the worm gear 28 I provide a compact arrangement which enables the use of the counter-shaft 39 as a step-down connection between one of the mixer shafts and the power shaft. The arrangement described makes it possible to hold the length of the casing 13 and also the diameter thereof to a minimum so that it does not present an overbalanced appearance when associated with the motor M as illustrated in Figure 1, yet I provide within the casing 13 all the necessary gears for operating the power shaft at a slow speed and the mixer and juicer shafts at an intermediate speed between the power shaft and the motor shaft speeds.

Formal changes may be made in the specific embodiments of the invention as above described without in any way departing from the spirit and substance of the broad invention, the scope of which is commensurate with the appended claims.

What I claim as my invention is:

1. In a power take-off for food mixers, a casing adapted to be mounted on one end of a mixer motor, a motor shaft projecting from the motor and entering said casing, said motor shaft having a worm within said casing, a pair of spaced mixer shafts journalled in said casing, said mixer shafts being arranged in a plane at substantially right angles to the axis of said motor shaft and being geared together, a worm gear on one of said mixer shafts meshing with said worm, a power shaft journalled in said casing and arranged substantially parallel to said motor shaft, said casing having a socket currounding said power shaft outwardly relative to the mixer shafts and adapted to receive a boss of a tool to be operated by said power shaft, a worm gear on said power shaft located inwardly relative to said mixer shafts and a counter-shaft extending substantially parallel to one of said mixer shafts, being geared thereto and having a worm meshing with the worm gear of said power shaft.

2. In a power take-off of the class described, a casing, a motor shaft entering said casing, said motor shaft having a worm within said casing, a pair of spaced mixer shafts journalled in said casing, said mixer shafts being geared together, a worm gear on one of said mixer shafts meshing with said worm, a power shaft journalled in said casing, and arranged between said mixer shafts with the axis of said power shaft at right angles to a plane passing through the axes of said mixer shafts, a worm gear on said power shaft located inwardly relative to said mixer shafts and means for operating said worm gear comprising a worm meshing with said worm gear of said power shaft, said last mentioned worm being geared to one of said mixer shafts.

3. In a power take-off for food mixers, a casing adapted to be mounted end to end on a mixer motor, a closure plate for the adjacent ends of said casing and mixer motor, a motor shaft projecting from the motor and entering said casing, a pair of spaced mixer shafts journalled in said casing and geared together, a worm gear on one of said mixer shafts meshing with said worm, a power shaft having one end journalled in said casing and its other end journalled in said closure plate, a worm gear on said power shaft and a counter-shaft extending substantially parallel to one of said mixer shafts, being geared thereto and having a worm meshing with the worm gear of said power shaft.

4. In a power take-off for food mixers, a casing mounted on one end of a mixer motor, a motor shaft projecting from the motor and entering said casing, a pair of spaced mixer shafts journalled in said casing, said mixer shafts being arranged in a plane at substantially right angles to the axis of said motor shaft and being geared together, one of said mixer shafts being operatively connected with said motor shaft, a power shaft journalled in said casing and arranged substantially parallel to said motor shaft, a worm gear on said power shaft and a counter-shaft geared to one of said mixer shafts and having a worm meshing with the worm gear of said power shaft.

5. In a power take-off for food mixers, a casing adapted to be mounted on one end of a mixer motor, a motor shaft projecting from the motor and entering said casing, said motor shaft having a worm within said casing, a pair of spaced mixer shafts journalled in said casing intermediate the inner and outer ends thereof and arranged transversely of the casing, intermeshing gears on said mixer shafts, a worm gear on one of said mixer shafts meshing with the worm of said motor shaft, a power shaft, a bearing therefor between said mixer shafts and arranged substantially parallel to said motor shaft, means at the outer end of said power shaft to connect with a tool to be driven thereby and means at the inner end thereof for operatively connecting the power shaft to one of said mixer shafts, said last means including a counter-shaft having a worm, a worm gear on the inner end of the power shaft meshing therewith and gears on the counter-shaft and one of said mixer shafts and meshing with each other.

6. In a device of the class described, a casing adapted to be mounted on one end of a motor, a motor shaft projecting from the motor and entering said casing, a pair of spaced mixer shafts journalled in said casing intermediate the inner and outer ends thereof, intermeshing gears on said mixer shafts, means for driving one of said mixer shafts from said motor shaft, a power shaft, a bearing therefor between said mixer shaft and means for operatively connecting the power shaft to one of said mixer shafts, said last means including a counter-shaft having a worm, a worm gear on the inner end of the power shaft meshing therewith and gears on the counter-shaft and one of said mixer shafts and meshing with each other.

WILLIAM BERNARD KOCHNER.